[31.]
*David Munson.*
*Lightning Rod.*
119,043.             Patented Sep. 19, 1871.
Fig. 1.          Fig. 2.
 
Fig. 3.          Fig. 4.
 
Fig. 5.          Fig. 6.
 
Witnesses:          Inventor:
J. West Wagner          David Munson
P. J. Boland          by Johnson, Klaucke &Co
                          his Attorneys

UNITED STATES PATENT OFFICE.

DAVID MUNSON, OF INDIANAPOLIS, INDIANA.

IMPROVEMENT IN LIGHTNING-RODS.

Specification forming part of Letters Patent No. 119,043, dated September 19, 1871.

*To all whom it may concern:*

Be it known that I, DAVID MUNSON, of Indianapolis, in the county of Marion and State of Indiana, have invented a new and useful Improvement in Lightning-Rods, of which the following is a specification:

My invention has for its purpose the increase in lightning-rods of the capacity for attracting and conducting the electric fluid; and I accomplish this by constructing the lightning-rod of any suitable number of wires drawn with sharp edges, either three-cornered or square, or formed of any suitable number of edges and twisted together in such a manner that a large number of surfaces and edges is formed at the same time, allowing a large amount of moisture to accumulate throughout the coil or twist of wires so as to neutralize the power of a heavy charge of electric fluid before it reaches the ground.

In the accompanying drawing, Figure 1 is a perspective view of a lightning-rod constructed according to my improvement. Fig. 2 is a cross-section of the same. Figs. 3 and 5 are perspective views of modifications of the same; and Figs. 4 and 6 are cross-sections of Figs 3 and 5.

In Figs. 1 and 2 of the drawing, I have shown a lightning-rod constructed of angular wires *a*, having four sharp edges, so that a cross-section of the wires shows them to be square. Copper being the best conductor known, I prefer to make the wire by drawing from copper. These wires are twisted or coiled so as to form a continuous rod, and present, on the outside, a number of sharp edges, and at the same time a very largely-increased number of surfaces to the electric fluid. It is a well-known fact that electricity is best attracted by points and edges, and that the greater the surface of the lightning-rod presented to the electric-fluid the more perfect is its conducting-power; while it is equally well an established fact that a certain amount of moisture is requisite to insure a safe passage for the electric charge as it passes over the rod into the ground. All these points are attained combinedly in my invention; for through the same means that a large number of separate surfaces is formed, sharp edges are also produced, and the twisted wires will receive and retain a larger quantity of moisture than any solid rod. Copper is avowedly the best material for lightning-rods, but when used in large quantities these angular copper wires will be very expensive, and to attain the same advantages at a greatly reduced cost I use the modifications shown in Figs. 3 and 6. *b* is a core-wire or piece of metal, which may be iron or any other cheap metal, around which angular copper wires are twisted, the core *b* giving the support while the wires *a* act as conductors. In Figs. 5 and 6 I show a still further modification, involving, however, the same points. The core in this case consists of several wires of metal cheaper than copper, in the outside space between each two of which the wires *a* are laid in the manner shown. In each of the modifications shown the copper wires are angular and present both several surfaces and sharp edges. It is not absolutely necessary, however, that the core-wires or metal-core should be of metal other than copper, for a copper core would answer every purpose; nor is it necessary that the same should be round, as they may be angular like the small outer wires. Any desired number of wires may be employed. The larger the number used the greater will be the conducting power of the rod. By reason of the uneven surfaces of the rod the intensity of face is lost or becomes less and less on these surfaces and before the electric fluid reaches the earth, for the electric current always seeks its level.

I do not claim, broadly, the use of wires of different metals twisted together to form a lightning-rod, but confine myself to the use of angular wires to increase the surface and conducting power of lightning-rods.

Having thus described my invention, what I claim is—

1. A continuous cable lightning-rod consisting of any suitable number of core and outside wires, the latter being angular, substantially as described.

2. A lightning-rod consisting of any suitable number of angular, sharp-edged copper wires, twisted around a core of some other cheaper metal to form a single rod, substantially as described.

3. A lightning-rod consisting of any suitable number of angular sharp-edged copper rods twisted between, and with any suitable number of round wires of a cheaper metal, to form a single rod, substantially as described.

DAVID MUNSON.

Witnesses:
THOS. H. BOWLES,
WINSTON P. NOBLE.                (31.)